United States Patent [19]
Huynh

[11] Patent Number: 4,810,953
[45] Date of Patent: Mar. 7, 1989

[54] ELECTRONIC INTERFACE DEVICE BETWEEN A SENSOR AND A DISPLAY UNIT

[75] Inventor: Tan D. Huynh, Champs Sur Marne, France

[73] Assignee: Veglia, Paris, France

[21] Appl. No.: 24,690

[22] Filed: Mar. 11, 1987

[30] Foreign Application Priority Data

Mar. 13, 1986 [FR] France .................. 86 03560
Jul. 15, 1986 [FR] France .................. 86 10269

[51] Int. Cl.$^4$ .................. G01R 19/26; G01R 15/08
[52] U.S. Cl. .................. 324/120; 73/313; 324/99 D; 324/115; 324/166
[58] Field of Search .................. 324/99 D, 120, 115, 324/166; 340/618, 870.09; 73/308, 313

[56] References Cited

U.S. PATENT DOCUMENTS 2,880,392 3/1959 Paulsen .................. 324/99 D
3,983,549 9/1976 Akita et al. .................. 340/870.09

FOREIGN PATENT DOCUMENTS 2849066 5/1980 Fed. Rep. of Germany .
8519396 12/1985 France .
2100487 12/1982 United Kingdom .

Primary Examiner—Ernest F. Karlsen
Attorney, Agent, or Firm—Stevens, Davis, Miller & Mosher

[57] ABSTRACT

An electronic interface device is provided for use between a sensor and a display unit, including a controllable generator which delivers a signal to the display unit and is connected to an input of a comparator whose other input receives the output signal of the sensor. The output of the comparator controls the up counting or the down counting of an up-down counter of clock pulses. The sign output of the up-down counter controls the generator.

19 Claims, 10 Drawing Sheets

ELECTRONIC INTERFACE DEVICE BETWEEN A SENSOR AND A DISPLAY UNIT

BACKGROUND OF THE INVENTION

1. Field of the Invention

The present invention relates to an electronic interface device between a sensor sensing a physical magnitude, with analog output, and a display device displaying the value of said physical magnitude, including:

a controllable generator for controlling said display means and having an analog output, and an analog amplitude comparator for comparing the amplitudes of the output signals of said sensor and of said controllable generator and whose binary output signal controls said controllable generator.

Such a device is used in particular on board motor vehicles. For example, such a device is inserted between the fuel level sensor in the tank of the vehicle and a display unit mounted on its dashboard.

2. Description of the Prior Art

A device of the above defined type is already known from the patent U.S. Pat. No. 3,983,549.

In this device, the controllable generator includes an oscillator, a shaping circuit, a counter, a D-A converter, and a memory. This controllable generator is adapted for delivering a monotonically increasing signal, and it is provided with an inhibition input, here in the memory, for "freezing" the output signal of the controllable generator when its value is equal to that of the output signal of the sensor. The assembly is controlled periodically for sampling the output signal of the sensor so as to obtain, on the display unit, a succession of values equal to the successive samples of the output signal of the sensor.

Such a device has however the drawback that it provides no damping of the rapid parasite variations which may effect the physical magnitude. In the case where this physical magnitude is the level of fuel in the tank of a vehicle, the rapid variations of the output signal of the sensor, which result from the haphazard movement of the fuel in the tank when the vehicle is moving, are not damped and so a stable indication is not obtained on the display unit representative of the mean level in the tank. So as to avoid supplying false indications when the vehicle is slanted, the device of patent U.S. Pat. No. 3,983,549 is adapted so that updating of the display is inhibited when the vehicle is on a slant, bu this provides no averaging effect of the signal at the output of the sensor and therefore does not guarantee that the displayed value represents the mean level of the fuel.

An interface device providing averaging is moreover known and described in the french application No. 85 19396 in the name of the applicant. In this device, the rapid parasite variations of the output signal of the sensor are damped by a low pass analog filter, using a resistor and a capacitor. Taking into account the fact that the time constant of the filter used must be relatively high, it is necessary to use a large capacitor, so of high cost price and space wasting. In addition, if it is desired to temporarily modify the filtering paramters so as to obtain a more satisfactory operation of the device, by reducing for example the time constant in the moments following switching off of the vehicle, so that the display unit gives an exact indication rapidly, it is necessary to use relays which further increase the cost and space required by the device.

To avoid these drawbacks, the above analog filter may be replaced by a digital filter, not requiring any filtering capacitor and of greater flexibility in use. This is the case with the devices described in the British application GB-A No. 2 100 487 and the German application DE-A No. 2 849 066, which include at the input an A-D converter, at the output a D-A converter and, between the two, several digital comparators and numerous digital processing circuits. The disadvantage of these devices is that they are complex and so require either numerous components, or a considerable semiconductor area if the assembly is formed on a single substrate.

The present invention overcomes the above drawbacks by providing a device capable of damping the rapid parasite variations of the physical magnitude by an averaging effect, and using neither high value capacitors nor complex digital processing circuits.

SUMMARY OF THE INVENTION

For this it provides a device of the above defined type, wherein said controllable generator is provided with a binary control input controlling the increase and decrease of its output signal, there are further provided a clock and a first up-down counter of a first clock signal, and the binary output signal from said comparator controls the up count and the down count of the first up-down counter, whose binary sign signal controls the increase and decrease of the output signal of said generator.

In the device of the invention, the up-down counter integrates and filters the rapid parasite variations affecting the output signal of the sensor. It provides then the same function as the capacitor of the analog filter of the prior art, but in a much simpler way than in a conventional digital filter.

Advantageously, controllable means are provided for controlling said generator so that it delivers a signal varying monotonically in a controlled direction and at a controlled speed.

In this case, the control of a high speed for the monotonic variation of the output signal of the generator, until this latter is equal to the output signal of the sensor, allows an exact displayed value to be obtained rapidly, when desired. This may be used for example when the tank has been filled, so as to know the level without having to wait for a relatively long time related to the time constant of the integration made by the first up-down counter, which is then temporarily out of service.

In a first embodiment of the invention, said controllable generator includes means for generating a first pulse train, a second up-down counter having a clock input receiving said first pulse train and a D-A converter connected to the digital output of said second up-down counter, the control input of said generator being the up-down count control input of said second up-down counter.

A generator having the above structure may be integrated on a relatively small semiconductor surface.

In a second embodiment, said physical magnitude is the fuel level on board a vehicle and said controllable generator includes means for generating a first pulse train of controllable recurrence frequency, controlled by the sign output of said first up-down counter, a second up-down counter having a clock input receiving said first pulse train and an up-down count control input connected, during movement of the vehicle, to a potential ensuring the down-count control, and a D-A converter connected to the digital output of said second up-down converter.

In this case, during movement of the vehicle, with the second up-down counter controlled for down counting, its digital output can only decrease. It is therefore not necessary to provide special circuits for disabling its increases, if it is desirable, during movement of the vehicle, to avoid the driver observing an increase of the displayed value, whereas normally the mean fuel level can only decrease. In fact, because of parasite operation or a particularly wide swerve of the vehicle, such an increase may occur and must be "blocked", that is to say not transmitted to the display unit, in the case of the first embodiment.

Advantageously, when said physical magnitude is the fuel level on board a vehicle having an additional sensor of one of the following types : electronic rev counter and flow meter, with said additional sensor generating a second pulse train, said means for generating said first pulse train are adapted so that the recurrence frequency of said first pulse train is a linear function of the recurrence frequency of said second pulse train.

Thus, up dating of the displayed value takes place at a rate all the higher the faster the vehicle is travelling and so consumes more fuel.

BRIEF DESCRIPTION OF THE DRAWINGS

The presetnt invention will be better understood from the following description of two embodiments of the interface device of the invention, with reference to the accompanying drawings in which.

DESCRIPTION OF THE PREFERRED EMBODIMENT

Figure 1:
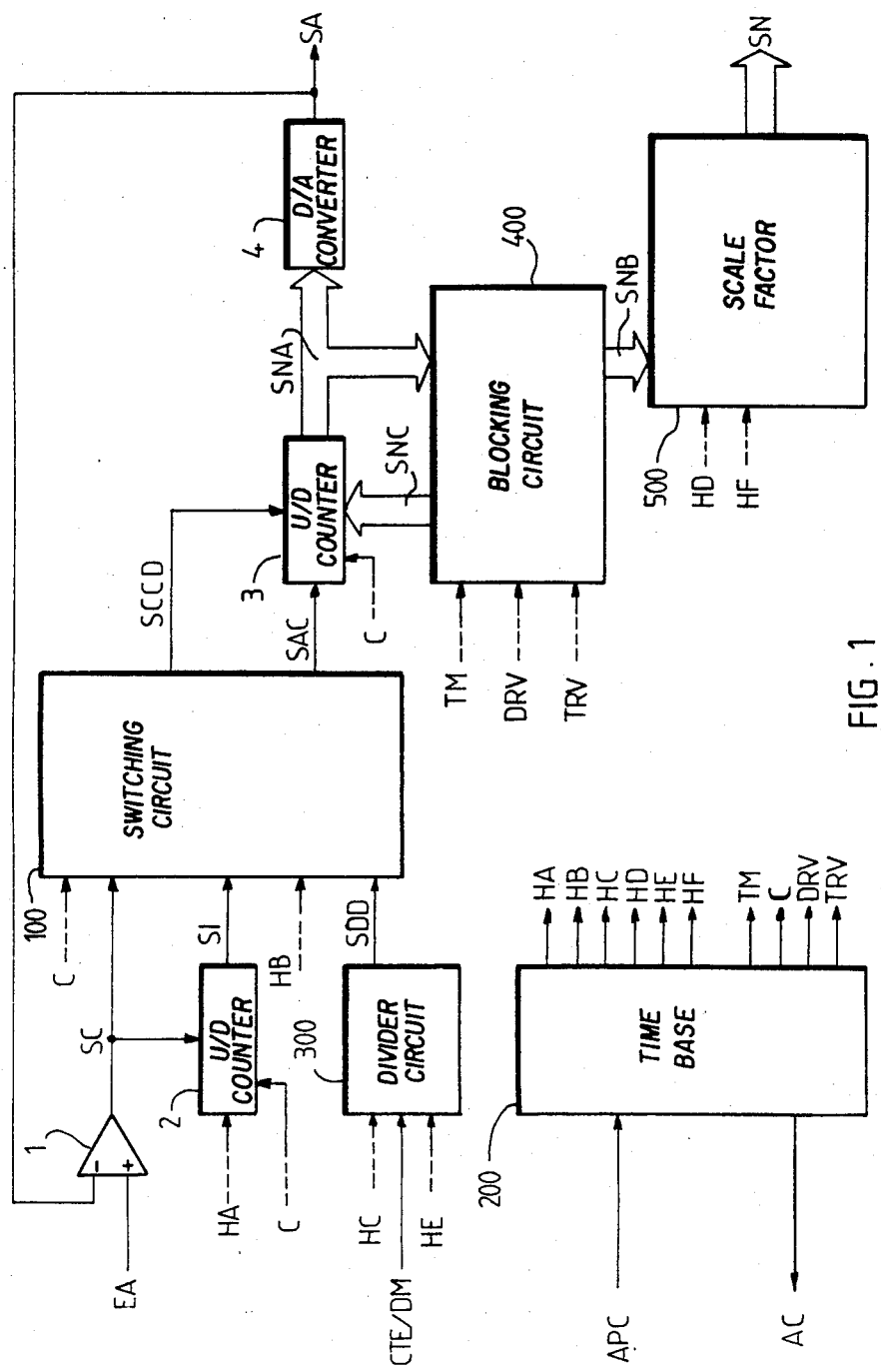
FIG. 1 shows a block diagram of a first embodiment of the device of the invention.

Referring to FIG. 1, an electric interface device or "interface" between a sensor detecting a physical magnitude and a display unit is used here in a motor vehicle for displaying the level of fuel in the tank of the vehicle.

The level sensor, not shown because it is known per se, mounted on this tank delivers to a first input of the interface an analog type electric signal EA representing the level of fuel in the tank.

An additional sensor of the electronic rev counter type or flow meter type, not shown because known per se, delivers to a second input of the interface a pulse train CTE/DM whose recurrence frequency is all the higher the faster the engine is rotating and the greater the instantaneous fuel consumption.

A binary signal APC, at the low level as long as the vehicle is not switched on and at the high level when it is switched on, that is to say when the "ignition" is switched on, available in a way known per se on any vehicle, is applied to a third input of the interface.

Furthermore, in a way not shown because known per se and for the sake of simplicity, all the electronic circuits and components of the interface are permanently fed from the battery of the vehicle, even when the "ignition" is switched off when the vehicle is stopped. The extremely low consumption of the interface, provided in the form of an integrated circuit using CMOS technology, in fact allows it to be left constantly supplied with power, without prejudice for the charge of the battery.

When it is supplied with power, in response to the preceding signals EA, CTE/DM and APC applied to its three inputs, the interface delivers signals SA, SN and AC at three outputs. As will be explained further on, the signal SA is analog and may be used for controlling an analog input display unit, for example of the mobile coil type. Signal SN is digital and may be used for controlling a digital display unit, for example of the 7 segments type. Signal AC is a signal for supplying the level sensor of the tank with electric power.

The construction of the interface will now be described. The input receiving the signal APC is connected to a time base 200 which here delivers six binary clock signals HA, HB, HC, HD, HE and HF, having six different frequencies and five binary signals AC, TM, C, DRV and TRV whose variations in time depends on the signal APC in a way which will be described further on.

The input receiving the signal EA is the "+" input of an analog amplitude comparator 1 whose "−" input is connected to the output delivering the signal SA.

The first up-down counter 2 is provided with a clock input receiving the clock signal HA, with a reset input receiving the signal C, an up-down count control input receiving the binary output signal of comparator SC and a binary sign output SI.

A divider circuit with shift 300 is provided with three inputs, receiving the clock signal HC, the clock signal HE and the signal CTE/DM, and an output delivering a signal SDD. The signal SDD is a pulse train whose recurrence frequency $f_{SDD}$ is a linear function of the recurrence frequency $f_{CTE/DM}$ of the signal CTE/DM, here in the form:

$$f_{SDD} = 1/N \; (f_{CTE/DM} - f_{HC})$$

in which expression N is a natural integer and $f_{HC}$ is the frequency of the clock signal HC.

Switching circuit 100 is provided with five inputs receiving the signals C, SC, SI, Hb and SDD, and two outputs delivering signals SCCD and SAC. As will be described further on, the output delivering the signal SCCD is switched either to the input receiving the signal SC, or to the input receiving the signal SI; similarly the output delivering the signal SAC is switched directly either to the input receiving the signal HB or to the input receiving the signal SDD.

A second up-down counter 3 is provided with a clock input receiving the signal SAC, a reset input receiving the signal C, an up-down count control input receiving the signal SCCD, a digital input, here parallel, receiving a digital signal SNC which will be defined subsequently, and a digital output, here parallel, delivering a digital signal SNA to a parallel bus.

A D-A converter 4 is provided with a digital input, here parallel, receiving the signal SNA, and an analog output delivering the signal SA.

A filling and emptying detection and parasite increase blocking circuit 400 is provided with three binary inputs receiving the signals TM, DRV and TRV, a digital input, here parallel, receiving the signal SNA and two digital outputs, here parallel, delivering a digital signal SNB and the digital signal SNC already discussed, connected to the parallel digital input of the second up-down counter 3.

Finally, a scale factor application circuit 500 is provided with two binary inputs receiving the clock signals HD and HF, a digital input, here parallel, receiving the signal SNB and a digital output, here parallel, delivering the signal SN.

Before describing each of these preceding circuits in greater detail, the operation of the interface which has just been described will now be discussed, while disregarding the filling and emptying detection and parasite increase blocking circuit 400 and the scale factor application circuit 500.

Figure 5:
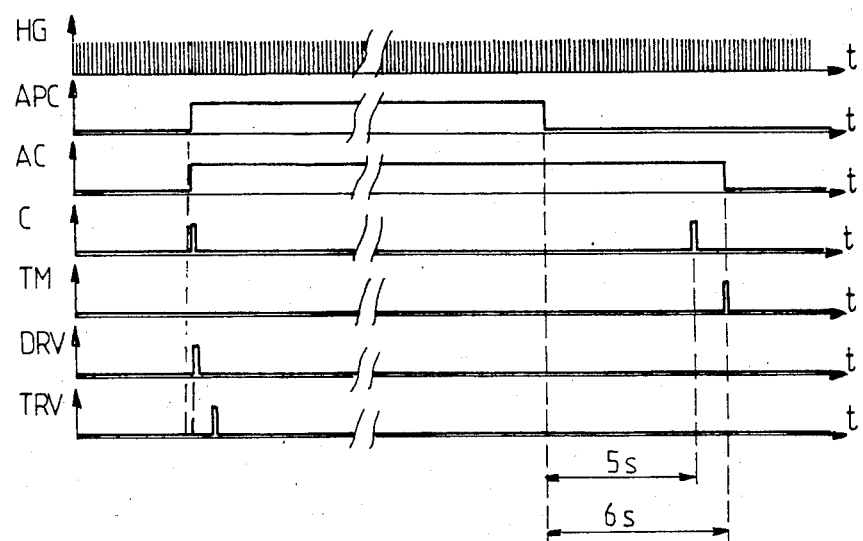
FIG. 5 shows a time chart of signals generated by the time base of FIG. 4.

Referring to FIG. 5, the time base 200, in response to the rising edge of signal APC, which means that the "ignition" of the vehicle has just been switched on, causes the signal AC to pass to the high level, so as to feed the level sensor with power, and causes the signal C to pass to the high level for a short period of time, so as to form a pulse, called conversion pulse for reasons which will be obvious hereafter. The conversion pulse of signal C resets the up-down counters 2 and 3 and orders the switching circuit 100 to switch the output delivering the signal SCCD to the input receiving the signal SC and the output delivering the signal SAC to the input receiving the signal HB. Immediately after the conversion pulse C, the up-down counter 3 is reset and therefore the signals SNA and SA are zero. Since the signal EA is positive because the level sensor is fed with power, the signal SC is at the high level. The signal SCCD is therefore at the high level, which corresponds to counting the pulses of signal SAC, that is to say of the signal HB, by the up-down counter 3. The digital signal SNA and the analog signal SA vary then monotonically, in the increasing direction, and at a speed controlled by the frequency of the clock signal HB, until, with signal SA equal to signal EA, the output signal SC of the comparator passes to the low level. In fact, at the time, the switching circuit 100, in response to the falling edge of signal SC switches the output delivering the signal SCCD to the input receiving the signal SI and the output delivering the signal SAC to the input receiving the signal SDD. As will be seen further on, the recurrence frequency of the pulses of signal SDD is very small compared with that of signal HB and the signals SNA and SA are no longer effected but by very slow variations. A conversion has then taken place, practically instantaneously as will be seen, and which allows signals SNA and SA to be obtained representative of the level in the reservoir, immediately after switching on of the "ignition". Here, the D-A converter 4 is an 8 bit converter and has therefore 256 levels, and the frequency of the clock signal HB is 2560 Hz. The conversion lasts then for a tenth of a second if the tank is full and less if the tank is only partially full.

During the conversion time, the up-down counter 2 has counted at most 1 pulse for the clock frequency of signal HA is here 10 Hz.

When the vehicle is travelling, because of the movements of the fuel in the tank, the signal EA is affected, about its mean value which evolves relatively slowly because of the consumption of the engine, by rapid parasite variations. The signal SC is at the high level for the positive variations of the signal EA and at the low level for its negative variations. Since signal SC controls the up counting and the down counting of the pulses of signal HA, by means of the up-down counter 2, the sign of the value counted by this up-down counter 2 is, after a certain time, representative of the mean variation of signal EA. In particular, if this sign is negative, it is because on average the signal EA has remained less than the signal SA which must then be reduced. This is obtained through signal SI which, recopied by the signal SCCD, controls the up count or the down count of the pulses of signal SAC by means of the second up-down counter 3, and so an increase or a decrease of the signals SNA and SA. The signal SAC, which recopies the signal SDD, has a recurrence frequency controlled by the signal CTE/DM so as to correspond substantially to a pulse every 20 minutes when the engine is ticking over and substantially 20 pulses per second when it is rotating at full speed. Thus, the drift of signal SA is all the greater the faster the engine is rotating, which allows an adjustment all the more rapid the higher the fuel consumption.

As can be seen, the displayed value, which depends on signals SNA or SA, depending on whether a digital or analog display unit is used, respectively, follows the slow variations of the level in the tank, without the rapid parasite variations of the signal EA being transmitted, through the integration effect, or else time averaging, of the first up-down counter 2. This result is obtained for it is the signal SI of the sign of the value counted by the first up-down counter 2, which controls the up counting or the down counting of the second up-down counter 3. More generally, it may be said that the shift divider circuit 300, the up-down counter 3 and the D-A converter 4, coupled in cascade, form a controllable generator, which controls the display unit, here by means of the signal SNA, and which is provided with an analog output delivering the signal SA, this signal SA being capable of increasing or decreasing depending on the value of the signal applied to the binary up-down count control input of the up-down counter 3, which input is then a binary input controlling the increase or the decrease of the signal SA at the output of the controllable generator, here receiving the signal SI.

Similarly, the purpose of the switching circuit 100 is to provide rapid conversion by controlling the preceding controllable generator so that it delivers a monotonically varying signal, here in an increasing direction and at a speed controllable by the value of the clock frequency of the signal HB.

The role of the filling and emptying detection and increase blocking circuit 400, as well as that of the scale factor application circuit 500 will now be discussed.

While the vehicle is travelling, the purpose of circuit 400 is to deliver an output signal SNB equal to the signal SNA except that if, for a reason which can only be parasite operation, the signal SNA increases, this parasite increase is not transmitted by the signal SNB, so that the driver of the vehicle cannot observe an increase of the displayed value, whereas he knows that the mean fuel level can only decrease.

Circuit 500 causes a scale factor to be applied to the signal SNB, so that the value indicated by the digital display unit situated downstream of circuit 500 represents directly, either liters, English gallons or American gallons.

The circuit 400 plays an additional role when the vehicle is stopped. At this time, as shown in FIG. 5, the time base 200 keeps the signal AC at the high level for six seconds in this case after the signal APC has passed to the low level, that is to say six seconds after the "ignition" has been switched off. The level sensor remains then supplied for six seconds after the vehicle has stopped. During this time, and here five second after stopping, the time base causes a rapid conversion by producing a signal C of pulsed form identical to that generated during switching on of the ignition. The time base produces then a pulsed signal TM, here six seconds after the vehicle has stopped, so as to order the circuit 400 to store, in an internal register, the value SA obtained after the rapid conversion which followed stopping of the vehicle.

The vehicle then remains at rest for a certain time during which, it will be reminded, the whole of the interface remains with voltage applied, but without any damage for the battery of the vehicle considering the low consumption of the circuits. Naturally, if the display unit not shown consumes a considerable amount of electric energy, its power supply is cut off, in a known way, during this time.

During the time it is stopped, there may be filling or emptying of the tank of the vehicle.

When the ignition is switched on again, when the vehicle moves again, a rapid conversion takes place, as has already been seen, because of the pulse in signal C. Immediately after the pulse in signal C, the time base produces a pulsed signal DRV which causes circuit 400 to compare the present value of SNA with that which it stored in the internal register after the preceding stopping of the vehicle.

If these two values are not equal, there has been filling or emptying, and when the time base produces immediately after the signal DRV a pulsed signal TRV, circuit 400 causes the signal SNB to take on the new value of the signal SNA.

If there is no detection of filling or emptying, circuit 400 causes the signal SNC to take on the value of signal SNB, which updates again the value of the up-down counter 3. This is particularly useful in the case where the vehicle has been parked on a slope and where the values converted five seconds after stopping, and at the time of starting, while being equal, are false with respect to the value SNB which results from a time average calculated over the duration of the distance previously travelled.

Figure 2:
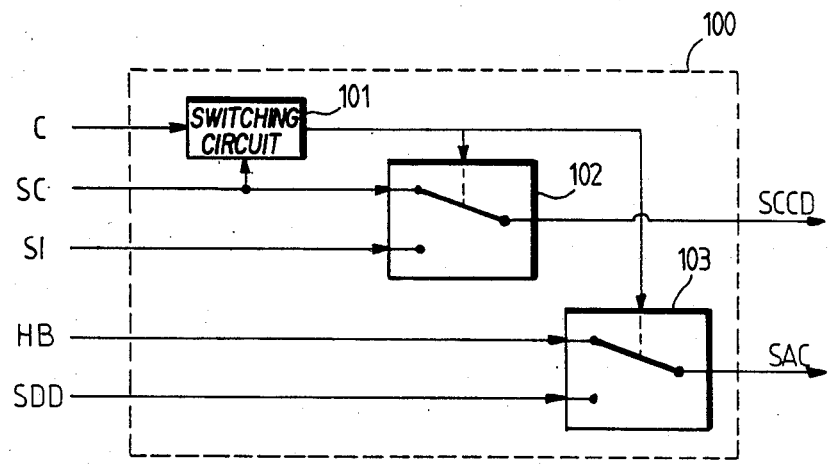
FIG. 2 shows a block diagram of the switching circuit of the device of FIG. 1.

Referring to FIG. 2, the switching circuit 100 includes a conventional type flip-flop 101 having an input receiving the signal C, a CLEAR input receiving the signal SC and an output. Two identical logic switches 102 and 103 are provided each with a control input connected to the output of flip-flop 101, two signal inputs and a signal output. The two signal inputs of switch 102 receive the signals SC and SI and its signal output delivers the signal SCCD. The two signal inputs of switch 103 receive the signals HB and SDD and its output delivers the signal SAC.

Figure 3:
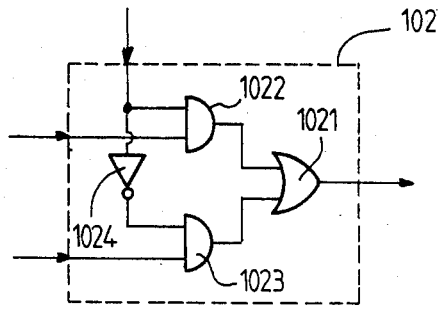
FIG. 3 shows a detailed diagram of the logic switch of the switching circuit of FIG. 2.

FIG. 3 shows a detailed diagram of the logic switch 102. The two inputs of an AND gate 1022 correspond to a signal input and to the control input. The two inputs of another AND gate 1023 correspond to the other signal input and to the control input inverted by means of an inverter 1024. The outputs of AND gates 1022 and 1023 are connected to the inputs of an OR gate 1021 whose output is the output of the signal from the logic switch 102.

The switching circuit 100 functions as follows. Flip-flop 101, in response to the pulse of signal C, delivers a high level at the control input of switches 102 and 103, so the signals SCCD and SAC recopy the signals SC and HB, respectively. When the signal SC, applied to the Clear input of flip-flop 101, passes to the low level, the rapid conversion is finished and flip-flop 101 delivers a low level to the control input of switches 102 and 103. The signals SCCD and SAC recopy the signals SI and SDD respectively.

Figure 4:
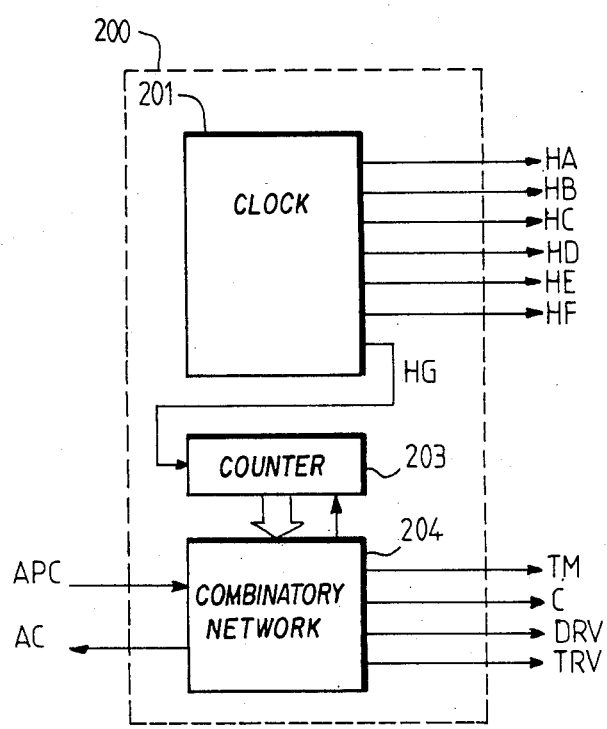
FIG. 4 shows a block diagram of the time base of the device of FIG. 1.

Referring to FIG. 4, the time base 200 includes a clock 201, of known type, having seven outputs delivering, on the one hand, the six clock signals HA, HB, HC, HD, HE and HF and, on the other hand, a clock signal HG. A counter 203 counts the pulses of the clock signal HG. A combinatory network 204, in response to the signal APC on the one hand and, on the other, to the parallel digital output of counter 203 delivers a signal for resetting counter 203 and the signals TM, C, DRV, TRV and AC which have been defined. The combinatory network 204 will not be described further for it is within the scope of a man skilled in the art.

Since the recurrence frequency of signal HG is of a few Hz, the time base 200 has a conventional operation. The rising and falling edges of signal APC trigger the resetting of counter 203, whose advance then triggers the different time delays through the combinatory network 204.

Figure 6:
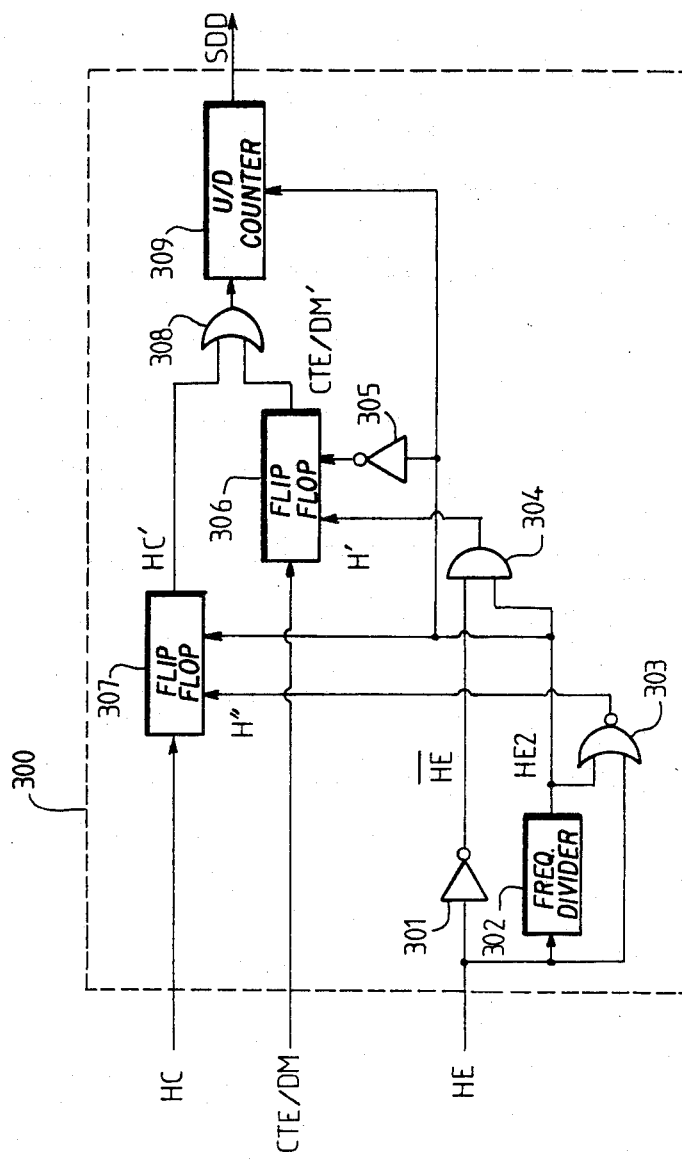
FIG. 6 shows a detailed diagram of the divider circuit with shift of the device of FIG. 1.

Referring to FIG. 6, the divider circuit with shift 300 includes two flip-flops 306 and 307 tripping on the clock front and receiving respectively the signals CTE/DM and HC and whose outputs are connected to an OR gate 308, itself coupled to the clock input of a third up-down counter 309, whose overflow output delivers the signal SDD. The signal HE is applied to an inverter 301, to a frequency divider 302 dividing by two and to an input of an $\overline{OR}$ gate 303 whose other input receives a signal HE2 at the output of the divider 302. The output signal H" of the $\overline{OR}$ gate 303 is applied to the clock input of flip-flop 307.

The signal $\overline{HE}$ at the output of inverter 301 and the signal HE2 are applied to an AND gate 304 whose output delivers a signal H' applied to the clock input of flip-flop 306. Signal HE2 is applied to the reset input of flip-flop 307, to the up-down count control input of the third up-down counter 309 and, through an inverter 305, to the reset input of flip-flop 306.

Figure 7:
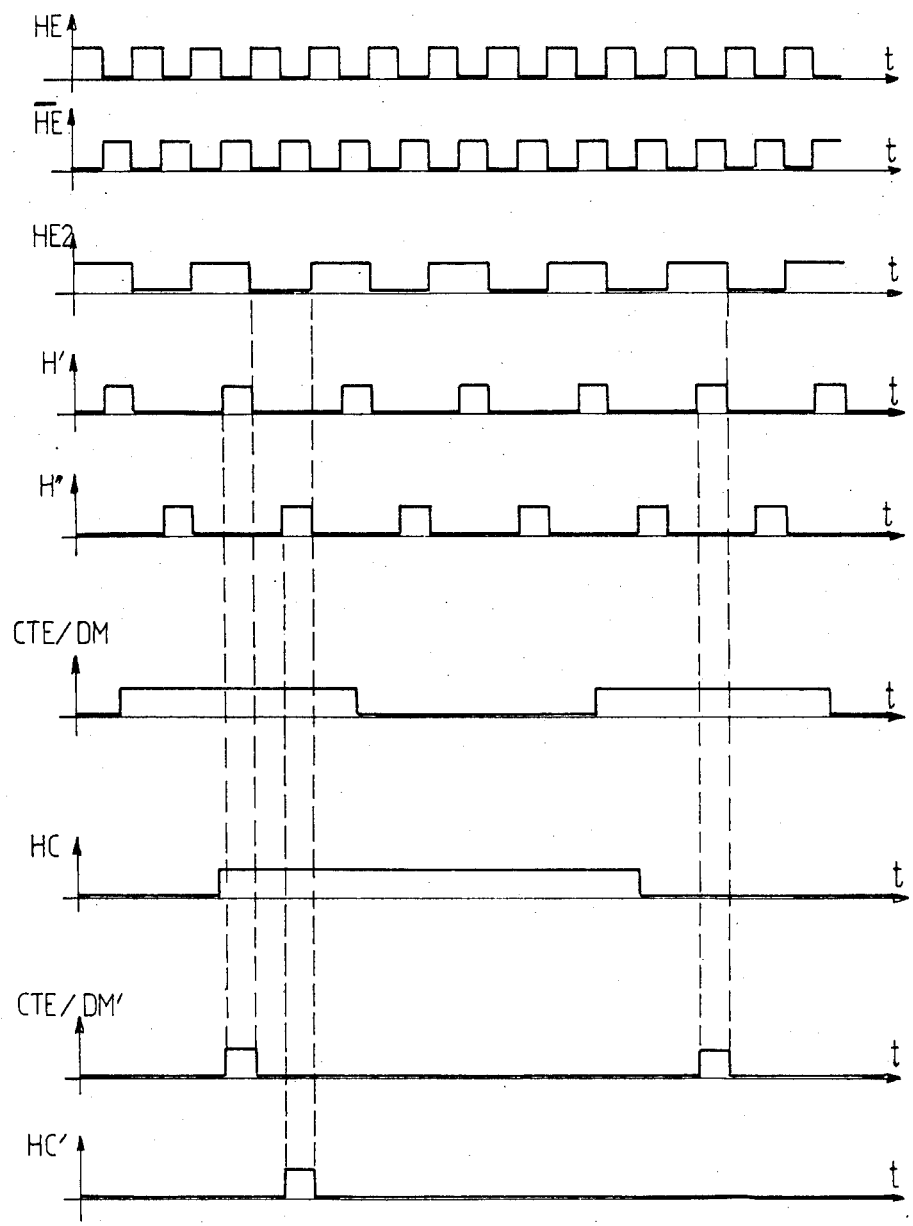
FIG. 7 shows a time chart of the main signals of the divider circuit with shift of FIG. 6.

The operation of the shift divider circuit is explained with reference to FIG. 7.

The signal CTE/DM has generally a recurrence frequency of the order of a few hundreds of Hz. As will be understood subsequently, the clock signal HC is of the same order of size, and a much higher frequency is chose for signal HE, here one of the order of a few tens of kilohertz. It is clear from the timing chart of signals HE, $\overline{HE}$, HE2, H' and H", shown in FIG. 7, that the signal HC' at the output of flip-flop 307 is a pulse whose rising edge is controlled by the first rising edge of signal H" which follows a rising edge of signal HC. Similarly, the signal CTE/DM' at the output of flip-flop 306 is a pulse whose rising edge is controlled by the first rising edge of signal H' which follows a rising edge of the signal CTE/DM. Considering the fact that the rising edges of signals H" and H' are always shifted in time, it is thus certain that the rising edges of signals HC' and CTE/DM' are shifted, even if the signals HC and CTE/DM have simultaneous rising edges. The falling edges of signals HC' and CTE/DM' corresponding respectively to the rising edge and to the falling edge of signal HE2 there is never overlapping of a pulse of the signal HC' and a pulse of the signal CTE/DM'. Since a pulse of signal HC' always takes place while the signal HC2 is at the low level, and since the signal HE2 controls the down count of the up-down counter 309, this pulse will always be down counted. Similarly, a pulse of signal CTE/DM' will always be up counted, for its always takes place while the signal HE2 is at the high level. Thus, after a second, the contents of the up-down counter 308 is equal to:

$$f_{CTE/DM} - f_{HC}.$$

If the up-down counter has a capacity of N, the overflow output then delivers a signal SDD of frequency $f_{SDD}$ such that:

$$f_{SDD} = 1/N(f_{CTE/DM} - f_{HC}).$$

The frequency $f_{CTE/DM}$ is therefore "shifted" by an amount $f_{HC}$ then divided by the number N, or else the frequency $f_{SDD}$ is a linear function of the frequency $f_{CTE/DM}$ We can then say that the flip-flop 306 and 307, as well as the OR gate 308, form a time multiplexing circuit having two inputs receiving the signals HC and CTE/DM and an output connected to the up-down counter 309, and that the divider 302 and the gates 301, 303, and 304 control the preceding multiplexing circuit, and the up-down counter 309 for up counting the pulses of signal CTE/DM and down counting those of the signal HC.

The result obtained, namely the division with shift of the frequency of the signal CTE/DM, is particularly useful in the frequent case where this signal is delivered by an electronic rev counter, for the consumption is not proportional to the speed of rotation of the engine. We may then, by adjusting the parameters N and fHC as well as possible, obtain a good concordance between the speed of compensation and consumption.

Figure 8:
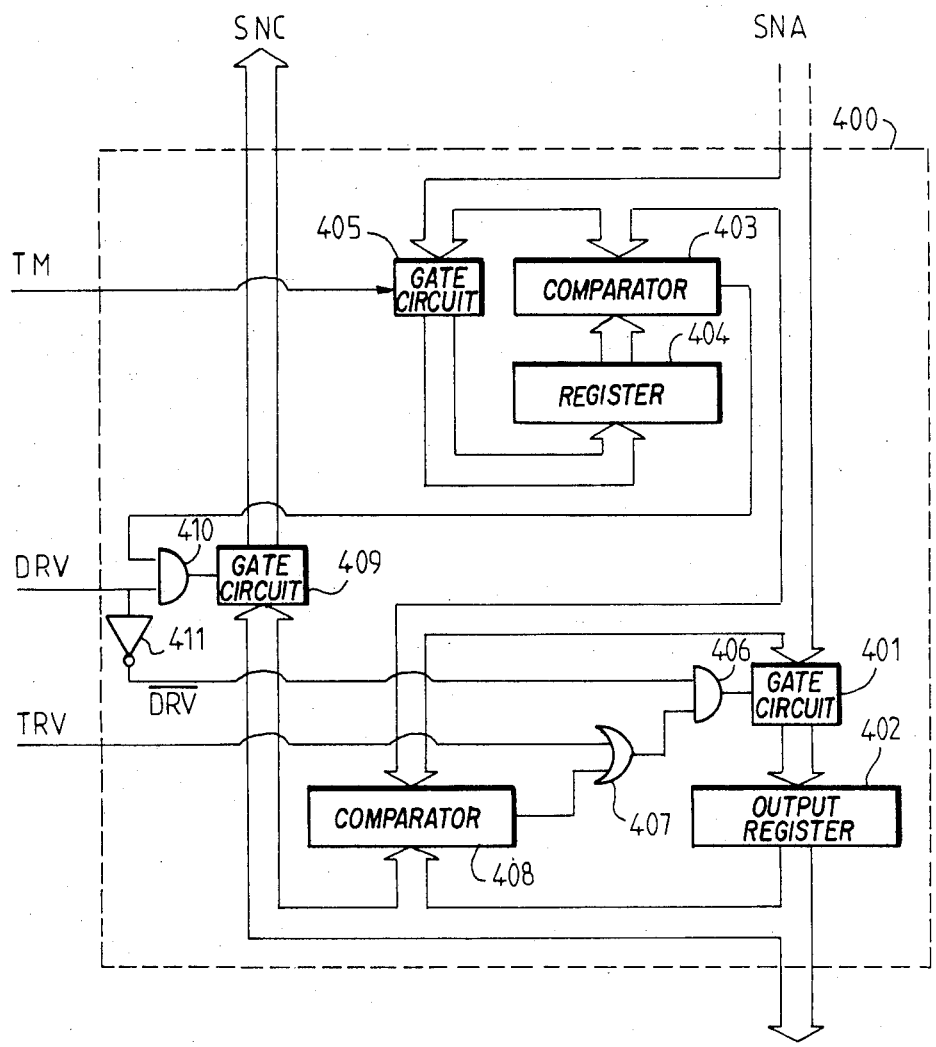
FIG. 8 shows a detailed diagram of the filling and emptying detection circuit for blocking parasite increases of the device of FIG. 1.

Referring to FIG. 8, the filling and emptying detection and parasite increase blocking circuit 400 includes, buffered between the input receiving the parallel digital signal SNA and the output delivering the parallel digital signal SNB, a gate circuit 401, of known type having three states, and an output register 402. It also includes a digital comparator 408 receiving, on the one hand, the digital signal SNA and, on the other, the digital signal SNB of the output register 402. A binary output of the comparator, at the high level when the value of the signal SNA is less that the value of signal SNB, is connected to an input of an OR gate 407 whose other input receives the signal TRV. The output of the OR gate 407 is connected to an input of an AND gate 406 whose other input receives the signal $\overline{DRV}$ obtained by inversion of the signal DRV in an inverter 411. The output of the AND gate 406 controls the gate circuit 401 so that these gates remain in the high impedance gate when the output of the AND gate 406 is at the low level, and allow the signal SNA to be written into the output register 402 when the output of the AND gate 406 is high.

The operation of the circuits which have just been described is as follows. During the major part of the time, the signal $\overline{DRV}$ is at the high level and the signal TRV at the low level. Writing of the signal SNA in the output register 402 is only possible if the output signal of the comparator is at the high level, that is to say if the value of the signal SNA is less than the value of signal SNB. Naturally, at the time when the signals TRV and $\overline{DRV}$ pass to the high level, as is the case after switching on the "ignition", this is no longer true, as will be explained hereafter. Thus, we may say that the comparator 408 and the gates 407 and 406 are means controlled by the signals TRV and DRV and adapted for preventing storage, by the gate circuit 401 and the output register 402, of a value higher than the previously stored value.

Thus, the parasite increases are not transmitted by the circuit 400.

The circuit 400 also includes another gate circuit 405 which receives the digital signal SNA and is followed by an internal register 404. The gate circuit 405, identical to the gate circuit 401, is controlled by the signal TM. A digital comparator 403, receiving on the one hand the digital signal SNA and, on the other, the signal stored in the internal register 404, is provided with a binary output, at the high level in the case of equality, applied to an input of an AND gate 410 receiving signal DRV at the other input. The output of the AND gate 410 controls a gate circuit 409, identical to the gate circuits 401 and 405, disposed between the output register delivering the signal SNB and the digital output delivering the signal SNC to the second up-down counter 3.

The operation of the circuits which have just been described is as follows. If, at the time when the signal DRV passes to level 1, the output of the comparator 403 is at the high level, there has been no filling or emptying, and the value stored in the output register 402 is transferred to the second up-down counter 3, via the gate circuit 409. In fact, this value represents the result of an integration, or averaging, over a fairly long time, and it is more exact than the value SNA at that time, especially if the vehicle has been parked on a slope. If there has been detection of filling and emptying, the gate circuit 409 remains disabled.

Naturally, while the signal NRV is at the high level the signal $\overline{DRV}$ is at the low level so as to ensure disabling of the gate circuit 401, so as to isolate the output register 402 and keep the value which is stored therein, useful in the case of non detection of filling or emptying.

The passage of the signal TRV to the high level then allows the value of signal SNA to be transferred to the output register 402, which is useful in the case of detection of filling or emptying.

Figure 9:
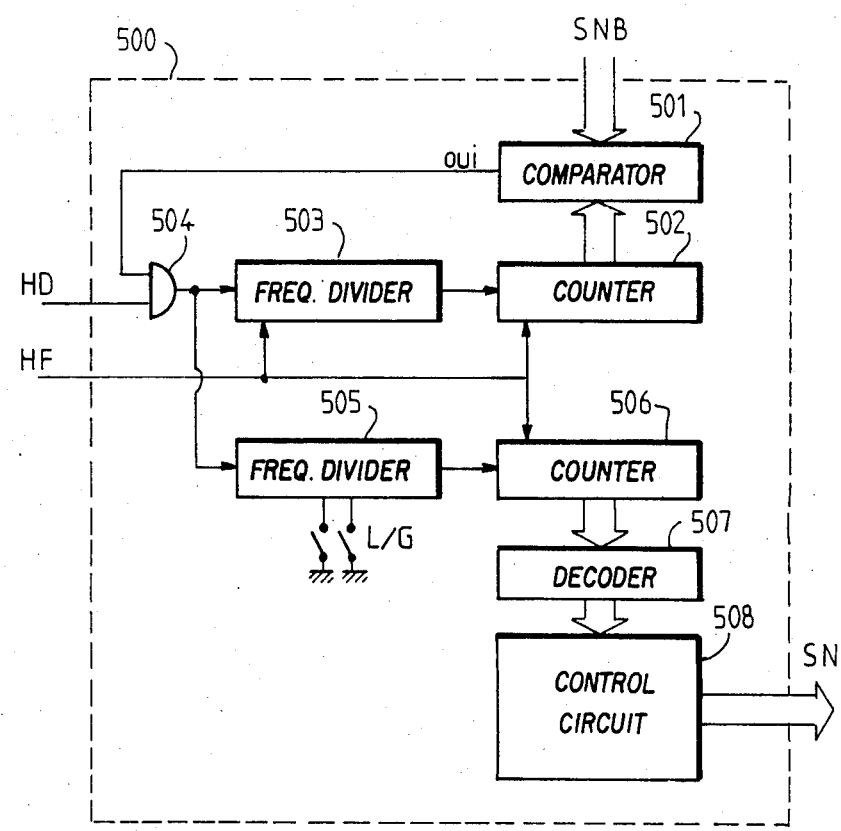
FIG. 9 shows a block diagram of the circuit applying a scale factor of the device of FIG. 1.

Referring now to FIG. 9, the scale factor application circuit 500 includes a first frequency divider 503 dividing by a fixed number, here a five bit counter dividing therefore by 32, followed by a counter 502 whose digital output is applied to an input of a digital comparator 501 receiving at its other input the digital signal SNB. The output of the digital comparator 501, at the high level in the case of equality, is applied to an input of an AND gate 504 whose other input receives the signal HD and whose output is applied to the clock input of the first divider 503. A second frequency divider 505, dividing by a controllable number, also receives at its clock input the output signal from the AND gate 504. The output of the second divider 505 is connected to a BCD counter 506, whose output is connected to a seven segment decoding circuit 507, of known type, itself followed by a control circuit 508, also of known type, for a digital display unit. The signal HF is fed to the reset inputs of counters 502, 503 and 506.

Figure 10:
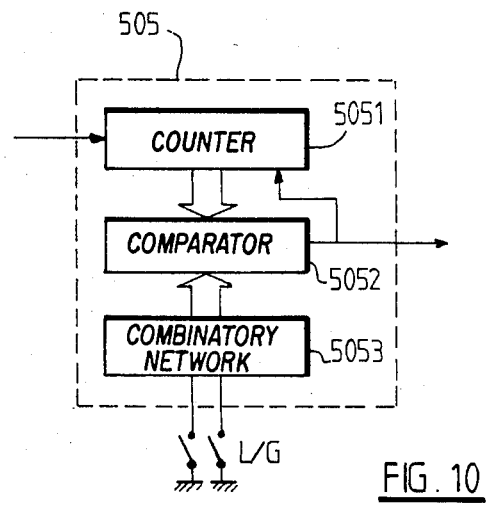
FIG. 10 shows a block diagram of the variable number divider of the scale factor application circuit of FIG. 9.

The second divider 505, dividing by a variable number, here includes, referring to FIG. 10, a counter 5051, whose digital output, here of seven bits, is compared in a digital comparator 5052 with a digital output, also of seven bits, of value M obtained by means of a combinatory network 5053 controlled by two switches L/G. The output of the digital comparator 5052 is connected to the reset input of counter 5051 and forms the output of divider 505 which divides by the number M, since a pulse is delivered to this output whenever M pulses have been counted by the counter 5051. The combinatory network 5053 will not be further described for it is within the scope of a man skilled in the art.

The scale factor application circuit operates as follows. The clock signal HF has here a frequency of 1 Hz. After being reset by the signal, the counter 502 counts the pulses delivered by the divider 503 until the comparator, detecting equality, orders blocking of the signal HD through the AND gate 504. The frequency of signal HD is here of the order of 100 Hz or so. At that time, the digital output of counter 502 is equal to the value of signal SNB, which means that a number n of pulses of the signal HD have passed through the gate 504, so that:

n=32×(SNB value).

Then the output of the BCD counter 506 is equal to:

n/M.

For the divider 505 divides by M. The output SN will then be equal to:

(32/M)×(value of SNB).

Thus the circuit 500 applies a scale factor equal to 32/M. Since M is controllable by means of switches L/G, here two in number, so as to be able to control at least three values of M corresponding respectively to liters, English gallons or American gallons, the interface is adaptable, by adjusting the switches L/G to any vehicle.

Figure 11:
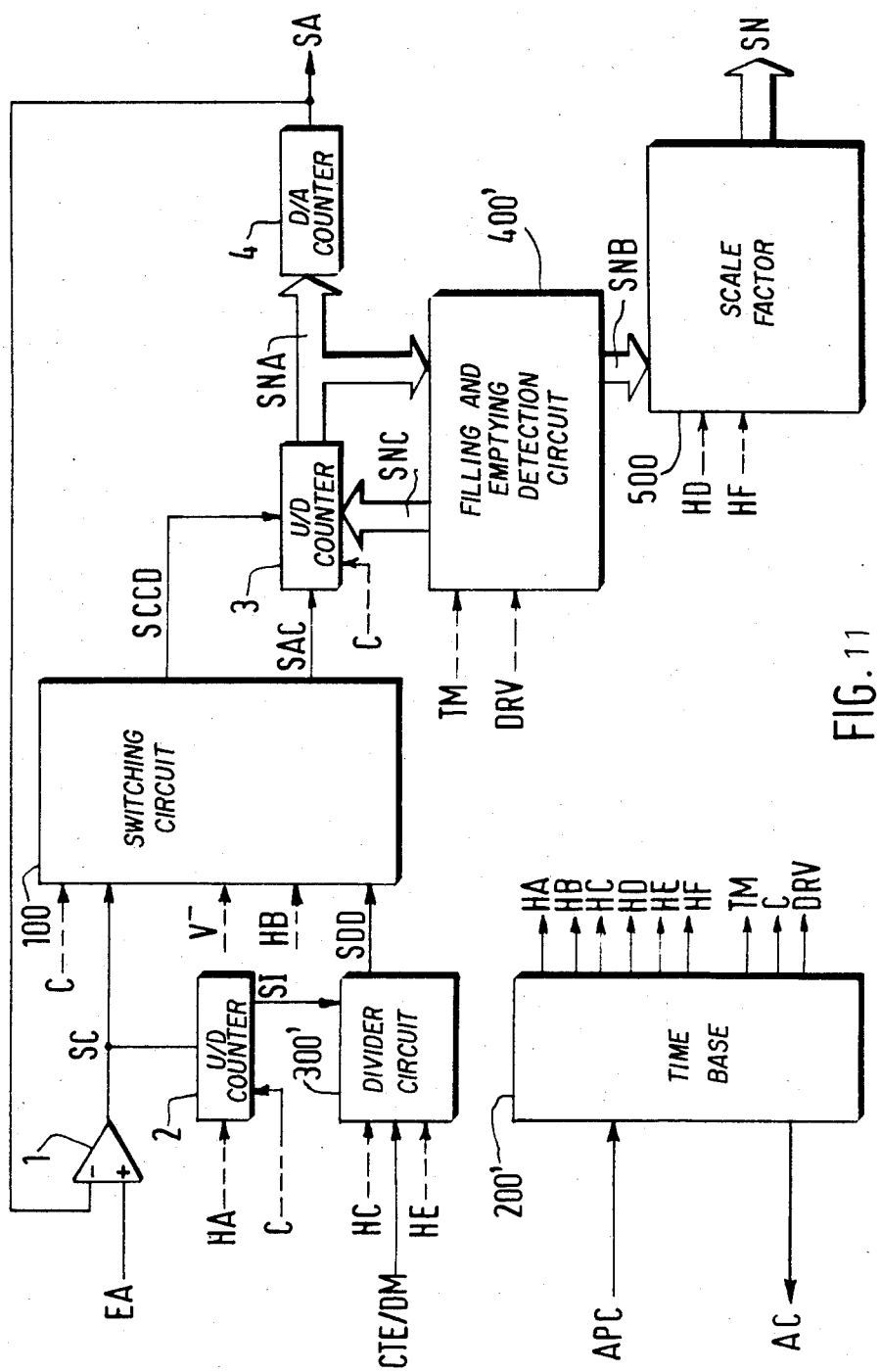
FIG. 11 shows a block diagram of a second embodiment of the device of the invention.

Referring to FIG. 11, a variant of the electronic interface device of the invention includes the same elements, designated by the same references, as the above described device, arranged in the same way, except that:

the input of the switching circuit 100 which receives the signal SI in the device described above is here connected to a constant potential V−, at the low logic level, the divider circuit with shift 300 is replaced by a divider circuit with shift 300′ with a controllable division ratio, having an input for controlling the division ratio receiving the signal SI, the filling and emptying detection and parasite increase blocking circuit 400 is replaced by a filling and emptying detection circuit 400′ and the time base 200 is replaced by a time base 200′.

Before describing the new circuits 200′, 300′ and 400′, in greater detail, the operation of the interface will be first of all described. During the rapid conversion phase which takes place after switching on the "ignition" of the vehicle, the present device operates exactly like the preceding device, for during this phase, the logic switches 102 and 103 are controlled so that the signals SCCD and SAC are identical to the signals SC and HB, which are not affected by the modifications described.

During movement of the vehicle, the logic switches 102 and 103 are controlled so that the signals SCCD and SAC are identical to the signals V− and SDD, respectively. Now, since the signal V− is at the low logic level, it is a potential controlling the down counting of the second up-down counter 3 which is applied to its control input. Thus the digital output SNA can only decrease. As will be seen hereafter, so that the analog signal SA follows as well as possible the variations of signal EA, the signal SI controls the division ratio of the shift divider circuit 300′, that is to say the recurrence frequency of the pulse train SDD, so the speed at which the digital signal SNA and the analog signal SA decrease. We may then say that the signal SI controls the decrease of signal SA while controlling its speed.

As in the preceding device, these signals follow the slow decrease of the level in the reservoir, without reproducing the rapid parasite variations of the signal EA because of the integration effect of the first up-down counter 2, whose sign output controls the speed of decrease.

The filling and emptying detection circuit 400′ acts like the filling and emptying detection and parasite increase blocking circuit 400 described above, when the ignition is switched on. But, in the present device, since the signal SNA can only decrease during movement of the vehicle, the circuit 400′ does not comprise any circuits for blocking the increases, since they are now useless.

Figure 12:
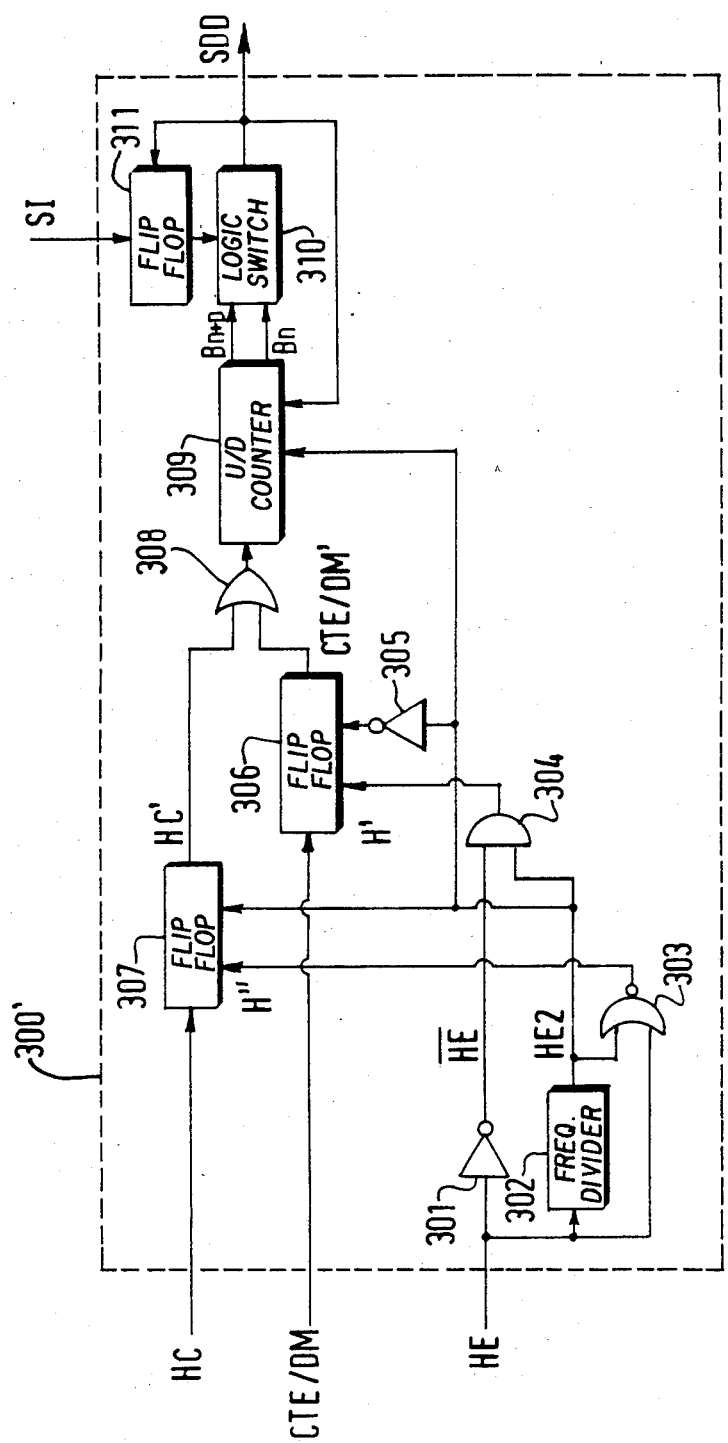
FIG. 12 shows a detailed diagram of the shift divider circuit with controllable division ratio of the device of FIG. 11.

Referring now to FIG. 12, the divider circuit with shift 300′ with a controllable division ratio includes on the one hand the same elements, designated by the same references, as the shift divider circuit 300, which elements will not be described again and, on the other hand, a logic switch 310 and a flip-flop 311.

There will now be used the reset input with which the up-down counter 309 is provided and, instead of the overflow output of this up-down counter 309, two binary outputs Bn and Bn+p corresponding to the bit or rank n and to the bit of rank n+p, respectively, of the digital output of the up-down counter 309.

The logic switch 310, identical to switch 102, is provided with a control input, two signal inputs connected to the two outputs Bn and Bn+p and a signal output delivering the signal SDD.

The flip-flop 311 is provided with an input D receiving the signal SI, an output Q connected to the control input of switch 310 and a clock input receiving the signal SDD.

The signal SDD is also applied to the reset input of the up-down counter 309.

Operation of the circuit 300' is as follows. At each time corresponding to a rising edge of a pulse of a signal SDD, the flip-flop 311 recopies at the output the signal value SI at that time, and holds it until the next rising edge. Let us suppose that this value corresponds to a negative sign at the output of the up-down counter 2. That means that, during the preceding time interval, the signal EA has remained on average less than the signal SA. This latter must then be reduced fairly quickly. For this, the logic switch 310 is adapted so that the signal SI controls the connection of the binary output Bn to the output SDD, whose recurrence frequency is then equal to:

$$f_{SDD} = \tfrac{1}{2}^n (f_{CTE/DM} - f_{HC}).$$

In the case where the signal SI corresponds to a positive sign, the signal SA must be reduced less rapidly, and it is therefore the binary output Bn+p which is connected to the output SDD, whose recurrence frequency is equal to:

$$f_{SDD} = \tfrac{1}{2}^{n+p} (f_{CTE/DM} - f_{HC}).$$

Thus, we may say that the slope of the linear function which connects the recurrence frequency $f_{SDD}$ to the recurrence frequency $f_{CTE/DM}$ is controlled by the sign output of the up-down counter 2.

Figure 13:
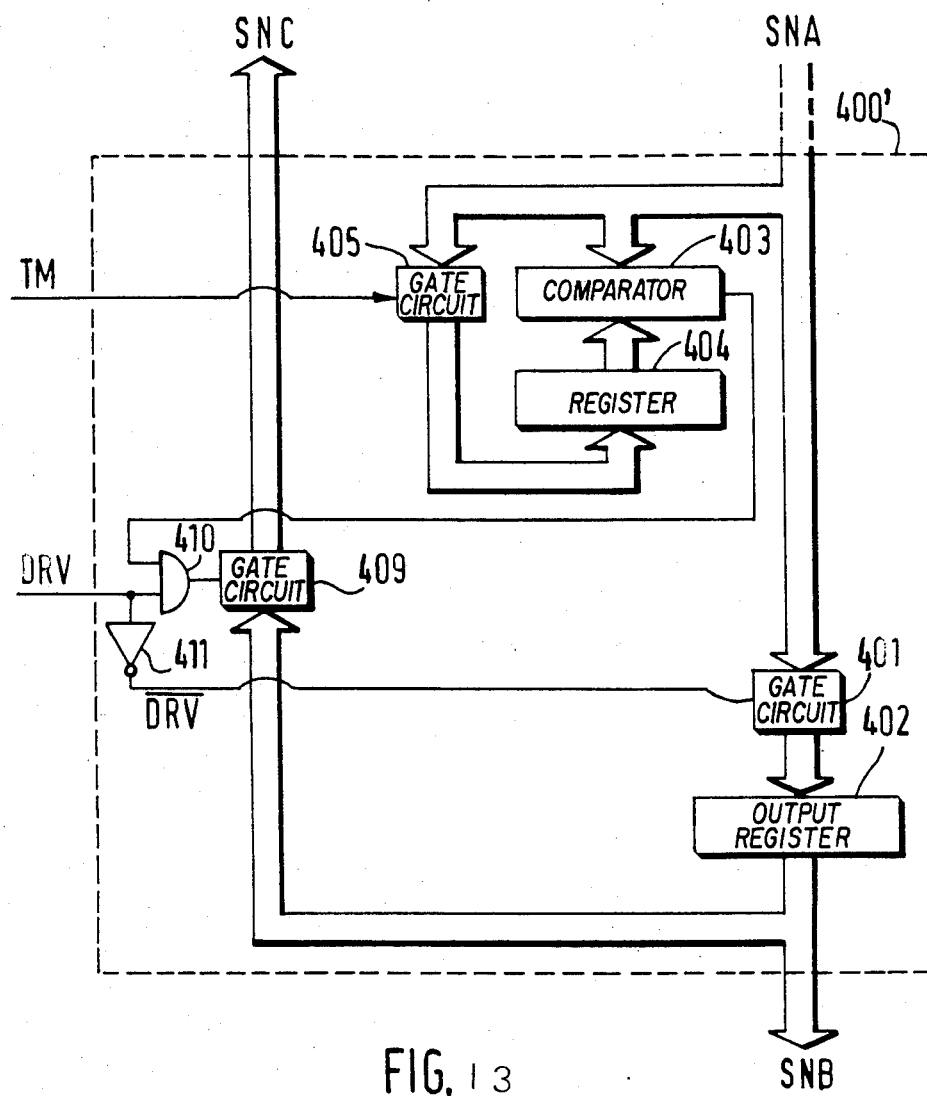
FIG. 13 shows a detailed diagram of the filling and emptying detection circuit of the device of FIG. 11.

Referring to FIG. 13, the filling and emptying detection circuit 400' has the same elements as the filling and emptying detection and parasite increase blocking circuit 400, except for the comparator 408, the OR gate 407 and the AND gate 406 which are suppressed. The signal $\overline{DRV}$ at the output for the inverter 411 is applied directly to the control output of the gate circuit 401.

The operation of the filling and emptying detection circuit 400' is comparable to that of circuit 400 in so far as the comparator 403, the gate circuit 405, the register 404, the gate circuit 409, the gate 410 and the inverter 411 are concerned. The signal $\overline{DRV}$ isolates the output register 402 and keeps the value which is stored therein, in the case of non detection of filling or emptying, during the time when the signal DRV is at the high level. As soon as the signal DRV is at the low level, the contents of the output register 402 is constantly equal to the signal SNA.

The time base 200' is identical to the time base 200 except that it does not deliver the signal TRV which is useless in the present embodiment.

In the second embodiment which has just been described, the slope of the linear function which connects the frequency of the pulse train SDD to the frequency of the pulse train CTE/DM only depends on the sign output of the up-down counter 2. It is possible to provide a variant in which, when the amount of petrol in the tank is less than a certain threshold, the slope corresponding to the highest frequency of the pulse train SDD is systematically controlled. Thus, when the tank is almost empty, the indication displayed is rather less than the reality. A man skilled in the art is capable of modifying these circuits which has just been described so as to provide such a variant.

Naturally, the two embodiments of the interface which have just been described are fairly complete and the interface of the invention may be constructed in simpler forms. For example, the divider circuit with shift 300 or 300', the circuit 400 or 400' for detecting emptying or filling and for blocking parasite increases, as well as the scale factor application circuit 500 are not absolutely necessary. One of them, two of them or even all three may be suppressed while simplifying the time base 200 accordingly, without departing from the scope and spirit of the invention.

In the case where the divider circuit with shift 300 or 300' is suppressed, the signal SDD must be replaced by a clock signal of a frequency such that a compromise is reached for correcting slow and fast operating conditions.

If an analog display unit is used controlled by the output SA, it is obviously useless to provide the circuits 400, or 400', and 500.

Furthermore, the device of the invention is not limited to the measurement of the level on board a motor vehicle and it may be used advantageously whenever rapid variations must be filtered between two points of an electronic circuit.

Naturally, it is not obligatory for the device to remain permanently supplied with power and it may be switched on for each use. In this case, non volatile memories must be provided, in particular for the circuit 400 or 400' if this latter is used.

What is claimed is:

1. An electronic interface device for use between a sensor detecting a physical magnitude and providing an analog output signal representative thereof and a display unit for displaying a value of said physical magnitude, said interface device comprising:
   a clock means for providing at least a first clock signal;
   a controllable generator for providing an analog output signal to control said display unit in accordance with a signal supplied thereto representative of a value to be displayed, said controllable generator having a control input for controlling an increase and decrease in said analog output signal thereof;
   a first up-down counter for receiving and counting said first clock signal and for providing a binary sign output signal to said control input of said generator; and
   an analog amplitude comparator for comparing said analog output signal of said generator with said analog output signal of said sensor and for providing an output signal which control the direction of up and down counting of said first clock signal by said first up-down counter.

2. The device as claimed in claim 1, further comprises controllable means for controlling said generator so that it provides, as said analog output signal thereof, a signal varying monotonically, in a controllable direction and at a controllable speed.

3. The device as claimed in claim 1, wherein said controllable generator comprises means for generating a clock input receiving said first pulse train, and an up-down control input and a D-A converter connected to a digital output of said second up-down counter, the control input of said generator being the up-down control input of said second up-down counter.

4. The device as claimed in claim 3, wherein said clock means provides a second clock signal and wherein said controllable means for controlling said generator comprises a first switching circuit for applying to the up-down count control input of said second up-down counter, instead of said binary sign output, said output of said comparator, and a second switching circuit for applying to said clock input of said second up-down counter, instead of said first pulse train, said second clock signal.

5. The device as claimed in claim 3, wherein said physical magnitude is the level of fuel on board a vehicle having an additional sensor of one of the following types: an electronic rev counter and a flow meter, said additional sensor generating a second pulse train, said means for generating said first pulse train including means for making the recurrence frequency of said first pulse train a linear function of the recurrence frequency of said second pulse train.

6. The device as claimed in claim 5, wherein said clock means provides a third clock signal and wherein said means for generating said first pulse train comprises a multiplexing circuit with two inputs, receiving said second pulse train and the third clock signal, and one output, a third up-down counter having a clock input connected to said output of said multiplexing circuit as well as an output delivering said first pulse train, and a control circuit connected to said multiplexing circuit and to an up-down count control input of said third up-down counter for controlling the up counting of the pulses of the second pulse train and the down counting of pulses of the third clock signal.

7. The device as claimed in claim 3, wherein said display unit is of the digital type, said device further comprising, disposed as a buffer between said digital output of said second up-down counter and said display unit, first means for storing, at a given time, the value of said digital output of said second up-down counter.

8. The device as claimed in claim 7, further comprising second means for storing at another given time the value of said digital output, a first digital comparator adapted for comparing the value of said digital output and the value stored in said second storing means, and means, controlled by said digital comparator for transferring the value stored in said first storing means into said second up-down counter.

9. The device as claimed in claim 7, further comprising controllable means for preventing the storage, at a given time, by said first storing means of a value higher than the value stored at a preceding given time.

10. The device as claimed in claim 3, further comprising means are provided upstream of said display unit for applying a controllable scale factor to the value of the digital signal to be displayed.

11. The device as claimed in claim 9, wherein said clock means provides a fourth clock signal and wherein said scale factor application means comprises a first frequency divider dividing by a fixed number, at the input of which is applied said fourth clock signal, a first counter connected to an output of said first frequency divider, a second frequency divider dividing by a controllable number, to the input of which is applied said fourth clock signal, a second counter connected to an output of said second frequency divider, a second digital comparator adapted for comparing a value representative of the digital output of said second up-down counter with a digital output of said first counter and means for blocking said fourth clock signal, controlled by said second digital comparator in the case of equality, a digital output of said second counter being connected to said display device.

12. A device as claimed in claim 1, wherein said physical magnitude is the level of fuel on board a vehicle and said controllable generator comprises:

means for generating a first pulse train of controllable recurrence frequency, controlled by said binary sign output of said first up-down counter, a second up-down counter having a clock input receiving said first pulse train and an up-down count control input connected, during movement of the vehicle, to a potential ensuring a down count control, and a D-A converter connected to a digital output of said second up-down counter.

13. The device as claimed in claim 12, wherein said clock means provides a second clock signal and wherein said controllable means for controlling said generator includes a first switching circuit for applying, at start up of said vehicle, to the up-down control input of said second up-down counter, instead of said potential ensuring the down count control, said output of said comparator, and a second switching circuit for applying, at start up of said vehicle, to said clock input of said second up-down counter, instead of said first pulse train, said second clock signal.

14. The device as claimed in claim 12, wherein said vehicle is provided with an additional sensor of one of the following types: an electronic rev counter and a flow meter, said additional sensor generating a second pulse train, said means for generating said first pulse train including means for making the recurrence frequency of said first pulse train a linear function of the recurrence frequency of said second pulse train, whose slope is controlled by said sign output of said first up-down counter.

15. The device as claimed in claim 14, wherein said clock means provides a third clock signal and wherein said means for generating said first pulse train comprises a multiplexing circuit with two inputs, receiving said second pulse train and said third clock signal, and an output, a third up-down counter having a clock input connected to said output of said multiplexing circuit as well as a parallel digital output, two bits of which are applied to a switching circuit controlled by said sign output for delivering said first pulse train, and a control circuit connected to said multiplexing circuit and to the up-down count control input of said third up-down counter for controlling the up counting of the pulses of the second pulse train and a down counting of the pulses of the third clock signal.

16. The device as claimed in claim 12, wherein said display unit is of the digital type, said device further comprising first means, disposed as a buffer between said digital output of said second up-down counter and said display unit, for storing, at a given time, the value of said digital output.

17. The device as claimed in claim 16, further comprising second means for storing at another given time the value of said digital output, a first digital counter adapted for controlling the value of said digital output and the value stored in said second means and means, controlled by said digital comparator, for transferring the values stored in said first storing means into said second up-down counter.

18. The device as claimed in claim 12, further comprising means provided upstream of said display unit for applying a controllable scale factor to the value of the digital signal to be displayed.

19. The device as claimed in claim 18, wherein said clock means provides a fourth clock signal and wherein said scale factor application means comprises a first frequency divider dividing by a fixed number, to the input of which is applied said fourth clock signal, a first counter connected to an output of said first frequency divider, a second frequency divider dividing by a controllable number, to the input of which is applied said fourth clock signal, a second counter connected to an output of said second frequency divider, a second digital comparator adapted for comparing a value representative of the digital output of said second up-down counter with a digital output of said first counter and a means for blocking said fourth clock signal, controlled by said second digital counter in the case of equality, a digital output of said second counter being connected to said display unit.

* * * * *